US006342559B1

(12) United States Patent
Takagishi

(10) Patent No.: US 6,342,559 B1
(45) Date of Patent: Jan. 29, 2002

(54) CONJUGATED DIENE RUBBER, PROCESS FOR PRODUCING THE SAME, AND RUBBER COMPOSITION

(75) Inventor: Yukio Takagishi, Kawasaki (JP)

(73) Assignee: Zeon Corporation, Tokyo (JP)

(*) Notice: Subject to any disclaimer, the term of this patent is extended or adjusted under 35 U.S.C. 154(b) by 0 days.

(21) Appl. No.: 09/647,453

(22) PCT Filed: Mar. 30, 1999

(86) PCT No.: PCT/JP99/01625
§ 371 Date: Sep. 29, 2000
§ 102(e) Date: Sep. 29, 2000

(87) PCT Pub. No.: WO99/50309
PCT Pub. Date: Oct. 7, 1999

(30) Foreign Application Priority Data

Mar. 31, 1998 (JP) ............................. 10-104113

(51) Int. Cl.$^7$ .............................. C08K 3/34; C08F 2/00
(52) U.S. Cl. ....................... 524/492; 524/493; 526/222; 526/224
(58) Field of Search .................. 524/492, 493; 526/222, 224

(56) References Cited

FOREIGN PATENT DOCUMENTS

| JP | A5331316 | 12/1993 |
| JP | A7118313 | 5/1995 |
| JP | A8100030 | 4/1996 |
| JP | A8104717 | 4/1996 |
| JP | A8151417 | 6/1996 |
| WO | A1-9422924 | 10/1994 |

Primary Examiner—Edward J. Cain
(74) Attorney, Agent, or Firm—Birch, Stewart, Kolasch & Birch, LLP

(57) ABSTRACT

A rubber composition which comprises a rubber ingredient comprising a diene rubber and a reinforcing agent comprising silica; said diene rubber being a copolymer comprising (1) 30 to 85% by weight of conjugated diene monomer units, (2) 15 to 50% by weight of aromatic vinyl monomer units and (3) 0.05 to 20% by weight of units of a vinyl monomer having a polar group, and the diene rubber having in the molecule an alkylthio group having 12 to 16 carbon atoms, which include at least three tertiary carbon atoms, and having a sulfur atom which is directly bound to at least one of the tertiary carbon atoms.

12 Claims, No Drawings

CONJUGATED DIENE RUBBER, PROCESS FOR PRODUCING THE SAME, AND RUBBER COMPOSITION

This application is the national phase under 35 U.S.C. § 371 of PCT International Application No. PCT/JP99/01625 which has an International filing date of Mar. 30, 1999, which designated the United States of America.

TECHNICAL FIELD

This invention relates to a conjugated diene rubber exhibiting good dispersibility when silica is incorporated therein. More particularly, it relates to a conjugated diene rubber suitable for a silica-incorporated rubber composition giving tires having a reduced rolling resistance.

BACKGROUND ART

In recent years, a serious view has been taken for saving resources and cleaning up the environment, and thus, the reduction of fuel consumption of automobiles is required severely. For the reduction of fuel consumption, reduction of rolling resistance of tires is desired. The reduction of rolling resistance of tires is attained usually by using a rubber material capable of providing a rubber vulcanizate exhibiting a reduced heat build-up.

Incorporation of silica as a reinforcer, instead of carbon black, in a diene rubber for tires has heretofore been proposed to give tires exhibiting a reduced heat build-up. Nevertheless, the silica-incorporated diene rubber composition has a problem such that the tensile strength and abrasion resistance are poor as compared with a carbon black-incorporated rubber composition. This would be due to the fact that silica has poorer affinity than carbon black to a diene rubber, and thus, silica does not exhibit a high reinforcing effect.

To enhance the affinity of silica to a diene rubber, a proposal of incorporating a silane-coupling agent has been made, for example, in Japanese Unexamined Patent Publication (hereinafter abbreviated to "JP-A") No. H3-252431 and JP-A H3-252433. In this proposal, an expensive silane-coupling agent must be used in a salient amount for enhancing the affinity of silica to the desired extent.

As another proposal, a conjugated diene rubber having introduced therein a substituent exhibiting an enhanced affinity to silica has been proposed. For example, among conjugated diene rubbers prepared by an emulsion polymerization procedure, a conjugated diene rubber having a tertiary amino group is described in JP-A H1-101344. Among conjugated diene rubbers prepared by an anion polymerization procedure, a conjugated diene rubber having an alkylsilyl group is described in JP-A H1-188501, a conjugated diene rubber having a halogenated silyl group is described in JP-A H5-230286, and a conjugated diene rubber having a substituted-amino group is described in JP-A S64-22940.

Most of the conjugated diene rubbers having the above-recited substituents have problems such that, when these rubbers are mixed with silica, they strongly agglomerate together with silica and do not allow silica to uniformly disperse, and consequently, processability is reduced, and characteristics such as low heat build-up, tensile strength and abrasion resistance are not improved to the desired extent.

To enhance dispersibility of silica in conjugated diene rubber, and improve characteristics such as low heat build-up, tensile strength and abrasion resistance, a proposal of using a conjugated diene rubber having introduced therein a polar group by copolymerization with a monomer having a polar group was made. However, due to the presence of a polar group in the main structure, this conjugated diene rubber has poor stability with time, tends to be easily gelled and the Mooney viscosity is apt to increase at a high temperature. Therefore, the conjugated diene rubber still has problems such that, when silica and other fillers are kneaded together, uniform kneading becomes difficult, and, because of high viscosity, processability is low and the handling is difficult.

In general, in radical polymerization of a conjugated diene monomer, branched chain formation or galling occurs with an increase of polymerization conversion. Consequently, when the resulting rubber is crosslinked with a crosslinking agent, a high crosslinking efficiency cannot be obtained and thus crosslinking properties such as tensile stress and impact resilience are deteriorated. To avoid these disadvantages, a molecular weight modifier is usually added to suppress the galling at the polymerization step. As the molecular weight modifier, t-dodecyl mercaptan is conventionally used in radical polymerization for a conjugated diene rubber, which is A mixture of isomers of alkylthiol compounds having 9 to 16 carbon atoms. The conjugated diene rubber obtained by using this molecular weight modifier exhibits poor high-rate crosslinkability when crosslinking is effected at a high temperature with a short crosslinking time, and thus, crosslinking of a desired degree is difficult to obtain.

A polymerization process for the production of a conjugated diene-aromatic vinyl compound copolymer rubber by using as a molecular weight modifier an alkylthiol compound having 12 to 16 carbon atoms, which include at least three tertiary carbon atoms, and having a sulfur atom which is directly bound to at least one of the tertiary carbon atoms, for example, 2,2',4,6,6'-pentamethylheptana-4-thiol is described in JP-A H8-104717. This polymerization process results in a rubber exhibiting a high-rate crosslinkability. However, It is not known to use the alkylthiol molecular weight modifier in polymerization for the production of a conjugated diene rubber having a polar group. It could not be foreseen what type of rubber vulcanizate would be obtained when a composition comprising the conjugated diene rubber having a polar group and silica is crosslinked.

SUMMARY OF THE INVENTION

A primary object of the present invention is to provide a conjugated diene rubber composition characterized as exhibiting uniform dispersibility of silica therein, good stability with time, stable Mooney viscosity at high temperature, good processability, and low heat build-up.

The present inventors made extensive researches to solve the above-mentioned problems of the prior art, and have found that the object of the invention can be achieved by copolymerizing a conjugated diene monomer, an aromatic vinyl monomer and a monomer having a polar group in the presence of a specific molecular weight modifier. Based on this finding, the present invention has been completed, In one aspect of the invention, there is provided a diene rubber which is a copolymer comprising (1) 30 to 85% by weight of conjugated diene monomer units, (2) 15 to 50% by weight of aromatic vinyl monomer units and (3) 0.05 to 20% by weight of units of a vinyl monomer having at least one kind of polar group selected from the group consisting of N,N-disubstituted-aminoalkyl acrylates, N,N-disubstituted-aminoalkyl methacrylates, N,N-disubstituted-aminoalkyl acrylamides, N,N-disubstituted-aminoalkyl methacrylamides, hydroxyl-substituted-alkyl acrylates and hydroxyl-substituted-alkyl methacrylates; said diene rubber having in the molecule an alkylthio group having 12 to 16 carbon atoms, which include at least three tertiary carbon atoms, and having a sulfur atom which is directly bound to at least one of the tertiary carbon atoms.

In another aspect of the invention, there is provided a process for producing a diene rubber which comprises copolymerizing (1) a conjugated diene monomer, (2) an aromatic vinyl monomer and (3) a vinyl monomer having at least one kind of polar group selected from the group consisting of N,N-disubstituted-aminoalkyl acrylates, N,N-disubstituted-aminoalkyl methacrylates, N,N-disubstituted-aminoalkyl acrylamides, N,N-disubstituted-aminoalkyl methacrylamides, hydroxyl-substituted-alkyl acrylates and hydroxyl-substituted-alkyl methacrylates, in the presence of (a) an alkylthiol compound having 12 to 16 carbon atoms, which include at least three tertiary carbon atoms, and having a sulfur atom which is directly bound to at least one of the tertiary carbon atoms, and (b) a free-radical initiator.

In a further aspect of the invention, there is provided a rubber composition comprising a rubber ingredient comprising the above-mentioned diene rubber, and a reinforcing agent comprising silica.

BEST MODE FOR CARRYING OUT THE INVENTION

Conjugated Diene Rubber Having Polar Group

The diene rubber having a polar group of the invention is a copolymer comprising (1) 30 to 84.95% by weight of conjugated diene monomer units, (2) 15 to 50% by weight of aromatic vinyl monomer units and (3) 0.05 to 20% by weight of units of a vinyl monomer having a polar group, and the conjugated diene rubber has in the molecule an alkylthio group having 12 to 16 carbon atoms, which include at least three tertiary carbon atoms, and having a-sulfur atom which is directly bound to at least one of the tertiary carbon atoms.

As specific examples of the diene rubber (1), there can be mentioned 1,3-butadiene, 2-methyl-1,3-butadiene, 2,3-dimethyl-1,3-butadiene, 2-chloro-1,3-butadiene and 1,3-pentadiene. Of these, 1,3-butadiene and 2-methyl-1,3-butadiene are preferable. 1,3-Butadiene Is especially preferable. These conjugated diene monomers may be used either alone or as a combination of at least two thereof.

As specific examples of the aromatic vinyl monomer (2), there can be mentioned styrene, α-methylstyrene, 2-methylstyrene, 3-methylstyrene, 4-methylstyrene, 2,4-diisopropylstyrene, 2,4-dimethylstyrene, 4-t-butylstyrene, 5-t-butyl-2-methylstyrene, monochlorostyrene, dichlorostyrene and monofluorostyrene. Of these, styrene is preferable. These vinyl aromatic monomers may be used either alone or as a combination of at least two thereof.

The vinyl monomer having a polar group is at least one monomer selected from N,N-disubstituted-aminoalkyl acrylates, N,N-disubstituted-aminoalkyl methacrylates, N,N-disubstituted-aminoalkyl acrylamides, N,N-disubstituted-aminoalkyl methacrylamides, hydroxyl-substituted-alkyl acrylates and hydroxyl-substituted-alkyl methacrylates.

Of these polar group-containing vinyl monomers, N,N-disubstituted-aminoalkyl acrylates, N,N-disubstituted-aminoalkyl methacrylates, N,N-disubstituted-aminoalkyl acrylamides and N,N-disabstituted-aminoalkyl methacrylamides are preferable.

As specific examples of N,N-disubstituted-aminoalkyl acrylates, there can be mentioned acrylic acid esters such as N,N-dimethylaminomethyl acrylate, N,N-dimethylaminoethyl acrylate, N,N-dimethylaninopropyl acrylate, N,N-dimethylaminobutyl acrylate, N,N-diethylaminoethyl acrylate, N,N-diethylaminopropyl acrylate, N,N-diethylaminobutyl acrylate, N-methyl-N-ethylaminoethyl acrylate, N,N-dipropylamlnoethyl acrylate, N,N-dibutylaminoethyl acrylate, N,N-dibutylaminopropyl acrylate, N,N-dibutylaminobutyl acrylate, N,N-dihexylaminoethyl acrylate, N,N-dioctylaminoethyl acrylate and acryloyl morpholine. Of these, N,N-dimethylaminoethyl acrylate, N,N-diethyluninoethyl acrylate, N,N-dipropylaminoethyl acrylate, N,N-dioctylaminoethyl acrylate and N-methyl-N-ethylaminoethyl acrylate are preferable.

As specific examples of N,N-disubstituted-aminoalkyl methacrylates, there can be mentioned methacrylic acid esters such as N,N-dimethylaminomethyl methacrylate N,N-dimethylaminoethyl methacrylate, N,N-dimethylaminopropyl methacrylate, N,N-dimethylaminobutyl methacrylate, N,N-diethylaminoethyl methacrylate, N,N-diethylaminopropyl methacrylate, N,N-diethylaminobutyl methacrylate, N-methyl-N-ethylaminoethyl methacrylate, N,N-dipropylaminoethyl methacrylate. N,N-dibutylaminoethyl methacrylate, N,N-dibutylaminopropyl methacrylate, N,N-dibutylaminobutyl methacrylate, N,N-dihexylaminoethyl methacrylate and N,N-dioctylaminoethyl methacrylate. Of these, N,N-dimethylaminoethyl methacrylate, N,N-diethylaminoethyl methacrylate, N,N-dipropylaminoethyl methacrylate, N,N-dioctylaminoethyl methacrylate and N-methyl-N-ethylaminoethyl methacrylate are preferable.

As specific examples of N,N-disubstituted-aminoalkyl acrylamides, there can be mentioned acrylamide compounds such as N,N-dimethylaminomethyl acrylamide, N,N-dimethylaminoethyl acrylamide, N,N-dimethylaminopropyl acrylamide, N,N-dimethylaminobutyl acrylamide, N,N-diethylaminoethyl acrylamide, N,N-diethylaminopropyl acrylamide, N,N-diethylaminobutyl acrylamide, N-methyl-N-ethylaminoethyl acrylamide, N,N-dipropylaminoethyl acrylamide, N,N-dibutylaminoethyl acrylamide, N,N-dibutylaminopropyl acrylamide, N,N-dibutylaminobutyl acrylamide, N,N-dihexylaminoethyl acrylamide N,N-dihexylaminopropyl acrylamide and N,N-dioctylaminopropyl acrylamide. Of these, N,N-dimethylaminopropyl acrylamide, N,N-dlethylaminopropyl acrylamide and N,N-dioctylaminopropyl acrylamide are preferable.

As specific examples of N,N-disubstituted-aminoalkyl methacrylamides, there can be mentioned methacrylamide compounds such as N,N-dimethylaminomethyl methacrylamide, N,N-dimethylaminoethyl methacrylamide, N,N-dimethylaminopropyl methacrylamide, N,N-dimethylaminobutyl methacrylamide, N,N-diethylaminoethyl methacrylamide, N,N-diethylaminopropyl methacrylamide, N,N-diethylaminobutyl methacrylamide, N-methyl-N-ethylaminoethyl methacrylamide, N,N-dipropylaminoethyl methacrylamide, N,N-dibutylaminoethyl methacrylamide, N,N-dibutylaminopropyl methacrylamide, N,N-dibutyl-aminobutyl methacrylamide, N,N-dihexylaminoethyl methacrylamide, N,N-dihexylaminopropyl methacrylamide and N,N-dioctylaminopropyl methaorylamide. Of these, N,N-dimethylaminopropyl methacrylamide, N,N-diethylaminopropyl methaorylamide and N,N-dioctylaminopropyl methacrylamide are preferable.

As specific examples of the hydroxy-substituted-alkyl acrylates and hydroxy-substituted-alkyl methacrylates, there can be mentioned hydroxymethyl acrylate, 2-hydroxyethyl acrylate, 2-hydroxypropyl acrylate, 3-hydroxypropyl acrylate, 3-chloro-2-hydroxypropyl acrylate, 3-phnoxy-2-hydroxypropyl acrylate, hydroxymethyl methacrylate, 2-hydroxyethyl methacrylate, 2-hydroxypropyl methacrylate, 3-hydroxypropyl methacrylate, 3-chloro-2-hydroxypropyl methacrylate and 3-phnoxy-2-hydroxypropyl methacrylate. Of these, hydroxymethyl acrylate, 2-hydroxyethyl acrylate, hydroxymethyl methacrylate and 2-hydroxyethyl methacrylate are preferable.

The contents of the monomer units in the polar group-containing diene rubber of the invention can be varied within the specified ranges depending upon the particular use of the rubber. The content of conjugated diene monomer units (1) is in the range of 30 to 85% by weight, preferably 40 to 82% by weight and more preferably 50 to 80% by weight. The content of aromatic vinyl monomer units (2) is in the range of 15 to 504 by weight, preferably 18 to 45% by weight and more preferably 20 to 40% by weight. The content of polar group-containing monomer units (3) is in the range of 0.05 to 20% by weight, preferably 0.1 to 15% by weight and more preferably 0.15 to 10% by weight. If desired, other copolymerizable monomer units may be contained in the conjugated diene rubber.

If the amount of conjugated diene monomer units (1) is too large, when the rubber is used for tires, skid resistance of tires is greatly reduced. In contrast, if the amount of the monomer units (1) is too small, the resulting rubber vulcanizate has too high hardness. If the amount of aromatic vinyl monomer units (2) is too large, when the rubber is used for tires, heat build-up of tires is too high. In contrast, if the amount of the monomer units (2) is too small, the resulting rubber vulcanizate has poor heat resistance. If the amount of polar group-containing monomer units (3) is too large, the rubber composition has poor processability. In contrast, if the amount of the monomer units (3) is too small, when the rubber is used for tires, reduction of heat build-up of the tires is not satisfactory.

The diene rubber of the invention has an alkylthio group having 12 to 16 carbon atoms, which include at least three tertiary carbon atoms, and having a sulfur atom which is directly bound to at least one of the tertiary carbon atoms. As specific examples of the alkylthio group, there can be mentioned 1,1-di(2,2-dimethylpropyl)-1-ethylthio group and 1,1-di(2,2-dimethylpropyl)-1-(2,2, 4,4-tetramethylpentyl)-1-ethylthio group. 1, 1-Di(2, 2-dimethylpropyl)-1-ethylthio group is especially preferable. The diene rubber of the invention may have either one kind of the alkylthio group having 12 to 16 carbon atoms including at least three tertiary carbon atoms, and having a sulfur atom directly bound to at least one of the tertiary carbon atoms, or at least two kinds of said alkylthio groups.

The content of the above-mentioned alkylthio group in the molecule of diene rubber of the invention is preferably at least 0.03 mol, more preferably at least 0.05 mol and especially preferably at least 0.07 mol, and preferably not larger than 0.3 mol, per 100 mols of the total monomer units constituting the molecule. If the content of the alkylthio group is too small, a high crosslinking efficiency cannot be obtained at a high-temperature short-time crosslinking, with the results that tensile stress and impact resilience of the molded article are not enhanced, and a high-rate crosslinking cannot be attained. As the content of the alkylthio group is increased, the scorching time (T5) is remarkably shortened, the crosslinking efficiency is greatly improved, and the maximum torque, as observed on a crosslinking curve drawn from values measured by an oscillating disc rheometer, is drastically increased.

The diene rubber of the invention usually has a Mooney viscosity ($ML_{1+4}$, 100° C.) of 20 to 200, preferably 30 to 150 and more preferably 50 to 120. If the Mooney viscosity of the conjugated diene rubber is too small, it is easy to produce, but its heat build-up and abrasion resistance are not sufficient for tire material. In contrast, if the Mooney viscosity of the rubber is too large, its abrasion resistance is high, but a rubber composition of the invention having additives incorporated therein has a high Mooney viscosity and poor processability.

Process for Producing Conjugatad Diene Rubber

The process for producing the diene rubber of the invention is not particularly limited, provided that (1) a conjugated diene monomer, (2) an aromatic vinyl monomer, (3) a vinyl monomer having at least one kind of polar group selected from the group consisting of N,N-disubstituted-aminoalkyl acrylates, N,N-disubstituted-aminoalkyl methacrylates, N,N-disubstituted-aminoalkyl acrylamides, N,N-disubstituted-aminoalkyl methacrylamides, hydroxyl-substituted-alkyl acrylates and hydroxyl-substituted-alkyl methacrylates, and (4) an optional copolymerizable monomer are copolymerized by free-radical polymerization in the presence of (a) a specific alkylthiol compound and (b) a free-radical Initiator. This production process is beneficial because the production efficiency is high and a conjugated diene rubber having a high-rate crosslinkability can easily be produced.

The alkylthiol compound (a) used as a molecular weight modifier in the process for producing the diene rubber of the invention has an alkylthio group having 12 to 16 carbon atoms, which include at least three tertiary carbon atoms, and having a sulfur atom which Is directly bound to at least one of the tertiary carbon atoms. As specific examples of the alkylthiol compound, there can be mentioned 2,2', 4,6,6-pentamethylheptane-4-thiol and 2,2',4,6,6', 8,8'-heptamethylnonane-4-thiol. 2,2', 4,6,6-Pentamethylheptane-4-thiol is especially preferable.

The alkylthiol compound may be used either alone or as a combination of at least two thereof. If desired, other molecular weight modifiers which are conventionally used for radical polymerization may be used in combination with the alkylthiol compound. When other conventional molecular weight modifier is used in combination with the alkylthiol compound, the amount of the alkylthiol compound is at least 50% by weight, preferably at least 80t by weight and more preferably at least 95% by weight, based on the total weight of the molecular weight modifiers.

As specific examples of the molecular weight modifier optionally used In combination with the alkylthiol compound, there can be mentioned xanthogendisulfides such as dimethylxanthogendisulfide, diethylxanthogendisulfide and diisopropylxanthogendisulfide; thiuram disulfides such as teramethylthiuram disulfide, teraethylthiuram disulfide and terabutylthiuram disulfide; halogenated hydrocarbons such as carbon tetrachloride and ethylene bromide; hydrocarbons such as pentaphenylethane; and acrolein, methacrolein, allylalcohol, 2-ethylhexyl thioglycolate, terpinolene, α-terpinene, γ-terpinene, dipentene, a-methylstyrene dimer (preferably containing at least 50% by weight of 2,4-diphenyl-4-methyl-1-pentene), 2,5-dihydrofuran, 3,6-dihydro-2H-pin, phthalan, 1,2-butadiene and 1,4-hexadiene.

The amount of the molecular weight modifier is preferably in the range of 0.05 to 3 parts by weight and more preferably 0.1 to 1 part by weight, based on 100 parts by weight of the total amount of the monomers used for copolymerization. When the amount of the molecular weight modifier is in this range, good molecular-weight-modifying effect can be obtained. By using the above-mentioned alkylthiol compound (a) as a molecular weight modifier for the production of the diene rubber of the invention, the polymerization conversion can be enhanced to 75% or higher, preferably 854 or higher, and thus, the conjugated diene rubber can be produced with a high productivity.

The free-radical initiator (b) used in the process of producing the diene rubber of the invention is not particularly limited, but usually includes organic peroxides, redox initiators, azo compounds and persulfates. These free-radical initiators may be used either alone or as a combination of at least two thereof.

As specific examples of the free-radical initiator, there can be mentioned persulfates such as ammonium persulfate and potassium persulfate; and redox initiators such as a combination of ammonium persulfate with ferric sulfate, a combination of an organic peroxide with ferric sulfate and a combination of hydrogen peroxide with ferric sulfate.

According to the process of the invention, even if the polymerization conversion is set at a high level, i.e., at least 80%, a conjugated diene rubber capable of being crosslinked at a high rate can be obtained. That is, the maximum torque of the rubber, as observed on a crosslinking curve drawn from values measured by an oscillating disc rheometer, is drastically increased.

The procedure by which the free-radical polymerization is carried out is not particularly limited, and may be selected from bulk polymerization, solution polymerization, suspension polymerization and emulsion polymerization according to the need. When an emulsion polymerization procedure is employed, an emulsifier having a carboxyl group is preferably used because, when the resulting conjugated diene rubber is subjected to a high-temperature short-time crosslinking, contamination of a mold used is minimized.

The amount of the free-radical initiator is preferably in the range of 0.005 to 3 parts by weight based on 100 parts by weight of the monomers.

The emulsifier having a carboxyl group includes, for example, fatty acid soaps and rosin soaps. As specific examples of the fatty acid soap, there can be mentioned a sodium salt and a potassium salt of a long-chain aliphatic carboxylic acid having 12 to 18 carbon atoms such as lauric acid, myristic acid, palmitic acid, stearic acid and oleic acid, and mixed aliphatic carboxylic acids thereof. As specific examples of the rosin soap, there can be mentioned a sodium salt and a potassium salt of a disproportionated or hydrogenated product of natural rosin such as gum rosin, wood rosin or tall oil rosin. The natural rosin contains as a main ingredient abietic acid, levopimalic acid, dehydroabietic acid, tetrahydroabietic acid or neoabietic acid. The amount of the emulsifier having a carboxyl group is not particularly limited, but is preferably in the range of 0.05 to 10 parts by weight and more preferably 0.5 to 5 parts by weight based on 100 parts by weight of the monomers.

The temperature at the emulsion polymerization can be suitably varied depending upon the particular kind of free-radical initiator (a), but is preferably in the range of 0 to 100° C. and more preferably 0 to 60° C. The type of polymerization may be either continuous polymerization or batch-wise polymerization.

When the polymerization conversion becomes large at the emulsion polymerization, gelling tends to occur. Therefore, the polymerization conversion is preferably suppressed to 90% or less, and more preferably 50 to 80%. The termination of polymerization is effected by adding a polymerization stopper to the polymerization system when the conversion reaches the desired value. The polymerization stopper used includes, for example, amine compounds such as diethylhydroxylamine and hydroxylamine, quinone compounds such as hydroquinons and benzoquinone, and sodium nitrite and sodium dithiocarbamate.

If desired, after the termination of emulsion polymerization, unreacted monomers are removed from the polymer latex, an acid such as nitric acid or sulfuric acid is added to adjust the pH of the polymer latex to the desired value, extender oil and other additives are incorporated, and a coagulant comprising a salt such as sodium chloride, calcium chloride or potassium chloride is added to coagulate the polymer into crumb. The crumb is washed with water, water is removed and the crumb is dried to give a conjugated diene rubber having a polar group. Analysis of the rubber by $^1$H-NMR (400 MHz) and $^{13}$C-NMR (100 MHz) reveals that the conjugated diene rubber has in the molecule an alkylthio group having 12 to 16 carbon atoms, which include at least three tertiary carbon atoms, and having a sulfur atom which is directly bound to at least one of the tertiary carbon atoms.

The extender oil optionally used is not particularly limited and includes, for example, process oils such as aromatic process oil, naphthenic process oil and paraffinic process oil, and plasticizers such as dioctyl adipate, dioctyl sebacate and dioctyl phthalate. After coagulation of rubber, the extender oil may be added at the step of kneading rubber, but, is preferably added prior to the kneading because an extended rubber is easy to knead.

Rubber Composition

The rubber composition of the invention comprises a rubber ingredient and a reinforcing agent comprising silica.

Rubber Ingredient

The rubber ingredient can comprise rubbers other than the conjugated diene rubber having a polar group.

The rubber optionally used is not particularly limited, provided that the object and effect of the invention can be achieved, and includes conventional diene rubbers. As specific examples of the conventional rubbers, there can be mentioned natural rubber, polyisoprene rubber, emulsion-polymerized styrene-butadiene copolymer rubber, solution-polymerized random styrene-butadiene copolymer rubber, high-trans styrene-butadiene copolymer rubber, low-cis polybutadiene rubber, high-cis butadiene rubber, high-trans butadione rubber, styrene-isoprene copolymer rubber, butadiene-isoprene copolymer rubber, solution-polymerized random styrene-butadlene-isoprene copolymer rubber, emulsion-polymerized styrene-butadiene-isoprene copolymer rubber, emulsion-polymerized styrene-acrylonitrile-butadiene copolymer rubber, acrylonitrile-butadiene copolymer rubber, high-vinyl styrene-butadiene copolymer/low-vinyl styrene-butadiene copolymer block copolymer rubber, and polystyrene/-polybutadiene/polystyrene block copolymer rubber. Suitable rubber may be selected from these rubbers. Of these, natural rubber, butadiene rubber, isoprene rubber, styrene-butadiene copolymer rubber and styrene-isoprene-butadiene copolymer rubber are preferable.

The rubber optionally used further includes rubbers other than diene rubbers, such as butyl rubber, halogenated butyl rubber, ethylene-propylene-diene terpolymer rubber and epichlorohydrin rubber.

The above-recited rubbers may be used either alone or as a combination of at least two thereof. When the optional rubber is used in combination with the conjugated diene rubber of the invention, the proportion of rubbers may be suitably selected depending upon the particular use or object of rubber, but, the amount of the conjugated diene rubber of the invention is preferably at least 50% by weight, more preferably at least 70% by weight and most preferably at least 904 by weight based on the total weight of the rubber ingredient.

Reinforcing Agent

The reinforcing agent incorporated in the rubber composition comprises silica. If desired, other reinforcing agents may be incorporated therein. The optional reinforcing agent is not particularly limited, and includes, for example, carbon black.

The silica is not particularly limited, and includes, for example, dry-process white carbon, wet-process white carbon, colloidal silica, and precipitated silica. Of these, wet-process white silica predominantly comprised of hydrous silicic acid is especially preferable. The silica may be used either alone or in combination.

The specific surface area of silica is not particularly limited, but is preferably in the range of 50 to 400 m$^2$/g, more preferably 100 to 250 m$^2$/g and especially preferably 120 to 190 m$^2$/g, as the nitrogen absorption specific surface area measured by the BET method according to ASTM D3037-81. When the specific surface area of silica is within this range, enhancement of reinforcing effect and abrasion resistance and reduction of heat build-up can be well attained.

Carbon black optionally used is not particularly limited, and includes, for example, furnace black, acetylene black, thermal black, channel black and graphite. Of these, furnace black is especially preferable, which includes various grades such as SAF, ISAF, ISAF-HS, ISAF-LS, IISAF-HS, HAF, HAF-HS, HAF-LS and FEF. Carbon black may be used either alone or as a combination of at least two thereof.

The specific surface area of carbon black is not particularly limited, and the nitrogen absorption specific surface area (N$_2$SA) is preferably in the range of 5 to 200 m$^2$/g, more preferably 50 to 150 m$^2$/g, and especially preferably 80 to 130 m$^2$/g. When the specific surface area of carbon black is within this range, enhancement of tensile strength and abrasion resistance can be well attained. The absorption of DSP by carbon black is also not particularly limited, but is preferably in the range of 5 to 300 ml/100 g, more preferably 50 to 200 ml/g and especially preferably 80 to 160 ml/100 g in view of the enhanced tensile strength and abrasion resistance.

Especially preferable carbon black is high-structure carbon black having a specific surface area of 110 to 170 m$^2$/g as measured by the method of absorption of cetyltrimethylammonium bromide (CTAB), and having a DBP absorption of 110 to 130 ml/100 g as measured after 4 times' repeated compression at a pressure of 24,000 psi (24M DBP). This carbon black highly enhances the abrasion resistance.

To attain the object of the invention, it is preferable that silica is used alone or in combination with carbon black, In the case where silica is used in combination with carbon black, the ratio by weight of silica/carbon black is preferably in the range of 10/90 to 99/1, more preferably 30/70 to 95/5 and especially preferably 50/50 to 90/10.

The amount of the reinforcing agent is preferably in the range of 10 to 200 parts by weight, more preferably 20 to 150 parts by weight and especially preferably 30 to 120 parts by weight based on 100 parts by weight of the rubber ingredient.

Other Ingredients

Ingredients other than the above-described ingredients may be incorporated in an appropriate amount In the rubber composition of the invention according to the need. Such ingredients include, for example, silane coupling agent, crosslinking agent, crosslinking accelerator, crosslinking promoter, antioxidant, activator, extender oil, lubricant and filler.

The silane coupling agent used is not particularly limited. As specific examples of the silane coupling agent, there can be mentioned vinyltrichlorosilane, vinyltriethoxysilane, vinyltris(β-mathoxyethoxy)silane, β-3,4-epoxycyclohexyl)-ethyltrimethoxysilane, γ-glycidoxypropyltrimethoxysllane, γ-methacryloxypropyltrimethoxysilane, N-(β-aminoethyl)-γ-aminopropyltrimethoxysilane, N-(β-aminoethyl)-γ-aminopropylmethyldimethoxysilane, N-phenyl-γ-aminopropyl-trimethoxysilane, γ-chloropropyltri-methoxysilane, γ-mercaptopropyltrimethoxysilane, γ-aminopropyltriethoxy-silane, and tetrasulfides such as bis [3-(triethoxysilyl)-propyl]tetrasulfide, γ-trirnethoxy-silylpropyl-dimethyl-thiocarbamyltetrasulfide and γ-trimethoxysilylpropyl-benzothiazyltetrasulfide.

The silane coupling agent may be used either alone or as a combination of at least two thereof. The amount of the silane coupling agent is preferably in the range of 0.1 to 30 parts by weight, more preferably 1 to 20 parts by weight and especially preferably 2 to 10 parts by weight based on 100 parts by weight of silica.

The antioxidant used is not particularly limited and includes, for example, phenolic antioxidants, sulfur-containing antioxidants and phosphorus-containing antioxidants.

As specific examples of the phenolic antioxidants, there can be mentioned general phenolic antioxidants such as 2,6-di-t-butyl-4-methylphenol, 2,6-di-t-butyl-4-ethylphenol, 2,6-di-t-butyl-4-n-butylphenol and 2,6-di-t-butyl-4-iso-butylphenol, and sulfur-containing phenolic antioxidants such as 2,4-bis(octylthiomethyl)-6-methylphenol, 2,4-bis(2', 3'-di-hydroxypropylthiomethyl)-3,6-dimethylphenol and 2,4-bis(2'-acetyloxyethylthiomethyl)-3,6-dimethylphenol.

As specific examples of the phosphorus-containing antioxidants, there can be mentioned tris(nonylphenyl)-phosphite, cyclic neopentanetetraylbis(octadecylphosphite) and tris(2,4-di-tert-butylphenyl)-phosphite.

As specific examples of the sulfur-containing antioxidants, there can be mentioned pentaerythritol-tetrakis-(β-laurylthiopropionate), dilauryl-3,3'-thiodipropionate, dimyristyl-3,3'-thiodipropionate and distearyl-3,3'-thiodipropionate, The crosslinking agent is not particularly limited, and, as specific examples thereof, there can be mentioned sulfur such as powdery sulfur, precipitated sulfur, colloidal sulfur, insoluble sulfur and highly dispersible sulfur: halogenated sulfur such as sulfur monochloride and sulfur dichloride; organic peroxides such as dicumyl peroxide and di-t-butyl peroxide; quinone dioximes such as p-quinone dioxime and p,p'-dibenzoylquinone dioxime; organic polyamines such as triethylenetetraamine, hexamethylenediamine carbamate and 4,4'-methylene-bis-o-chloroaniline; and alkylphenol resin having a methylol group. Of these, sulfur is preferable. Powdery sulfur is especially preferable. These crosslinking agents may be used either alone or as a combination of at least two thereof.

The amount of the crosslinking agent is preferably in the range of 0.1 to 15 parts by weight, more preferably 0.3 to 10 parts by weight and especially preferably 0.5 to 5 parts by weight based on 100 parts by weight of the rubber ingredient. When the amount of the crosslinking agent is within this range, a rubber vulcanizate having enhanced tensile strength, abrasion resistance and thermal resistance, and reduced permanent set is obtained.

As specific examples of the crosslinking accelerator, there can be mentioned sulfenamide crosslinking accelerators such as N-cyclohexyl-2-benzothiazolesulfenamide, N-t-butyl-2-benzothiazolesulfenamide, N-oxyethylene-2-benzothiazole-sulfenamide and N,N'-di-isopropyl-2-benzothiazolesulfenamide; guanidine crosslinking accelerators such as diphenylguanidine, diorthotolylguanidine and orthotolylbiguanidine, thiourea crosslinking accelerators such as thiocarboanilide, diorthotolylthiourea, ethylenethiourea, diethylthlourea and trimethylthiourea; thiazole crosslinking accelerators such as 2-mercaptobenzothiazole, dibenzothiazyl disulfide, 2-mercaptobenthiazole zinc salt, 2-mercaptobenthiazole sodium salt, 2-mercaptobenthiazole cyclohexylamine salt and 2-(2,4-dinitrophenylthio)benzothiazole; thiuram crosslinking accelerators such as tetramethylthiuram monosulfide, tetramethylthiuram disulfide, tetraethylthiuram disulfide, tetrabutylthluram disulfide and dipentamethylenethiuram tetrasulfide; dithiocarbamate crosslinking accelerators such as sodium dimethyldithiocarbamate, sodium diethyldithiocarbamate, sodium di-n-butyldithiocarbamate, lead dimethyldithiocarbamate, zinc dimethyldithiocarbamate, zinc diethyldithiocarbamate, zinc di-n-butyldlthiocarbamate, zinc pentamethylene-dithiocarbamate, zinc ethylphenyldithiocarbamate, tellurium diethyldithiocarbamate, selenium dimethyl-dithiocarbamate, selenium diethyldithiocarbamate, copper dimethyldlthiocarbamate, iron dimethyldithiocarbamate, diethylamine diethyldithiocarbamate, piperidine pentamethylenedithiocarbamate and pipecoline methylpentamethylenedithiocarbamate; and xanthogenate crosslinking accelerators such as sodium isopropylxanthogenate, zinc isopropylxanthogenate and zinc butylxanthogenate.

These crosslinking accelerators may be used either alone or as a combination of at least two thereof. Preferably sulfenamide crosslinking accelerator is used alone or in combination. When a sulfenamide crosslinking accelerator is used in combination, the content of the sulfenamide crosslinking accelerator in the mixed crosslinking crosslinking accelerator is preferably at least 30% by weight, more preferably at least 50% by weight and especially preferably at least 70% by weight, based on the mixed crosslinking crosslinking accelerator. The amount of the crosslinking accelerator is preferably in the range of 0.1 to 15 parts by weight, more preferably 0.3 to 10 parts by weight and especially preferably 0.5 to 5 parts by weight, based on 100 parts by weight of the rubber ingredient, The crosslinking promoter is not particularly limited, and includes, for example, higher fatty acids such as stearic acid, and zinc oxide. As the zinc oxide, those which have a particle diameter of not larger than 5 μm and thus have a high surface activity are preferable. As specific examples of the preferable zinc oxide, there can be mentioned there can be mentioned active zinc oxide having a particle diameter of 0.05 to 0.2 μm and zinc oxide having a particle diameter of 0.3 to 1 μm. The zinc oxide can be surface-treated with an amine dispersing agent or a wetting agent.

The crosslinking promoter may be used either alone or as a combination of at least two thereof. The amount of the crosslinking promoter is appropriately chosen depending upon the particular kind of crosslinking promoter. When a higher fatty acid is used, its amount is preferably in the range of 0.05 to 15 parts by weight, more preferably 0.1 to 10 parts by weight and especially preferably 0.5 to 5 parts by weight, based on 100 parts by weight of the rubber ingredient. When zinc oxide is used, its amount is preferably in the range of 0.05 to 10 parts by weight, more preferably 0.1 to 5 parts by weight and especially preferably 0.5 to 2 parts by weight, based on 100 parts by weight of the rubber ingredient. When the amount of zinc oxide falls within this range, processability, tensile strength and abrasion resistance are well balanced.

As examples of the other components, there can be mentioned coupling agents other than the silane coupling agent; activators such as diethylene glycol, polyethylene glycol and silicone oil; fillers such as calcium carbonate, talc and clay; and process oil and wax.

The rubber composition of the invention can be prepared by kneading together the respective ingredients by a conventional procedure. For example, the rubber ingredient is dissolved or dispersed in an organic solvent, and the other ingredients are incorporated in the solution or dispersion of the rubber ingredient. Then the organic solvent is removed by a steam stripping method or a hot roll method. Alternatively, the respective ingredients are kneaded together by using rolls, a Banbury mixer or an extruder.

The invention will now be specifically described by the following working examples.

The properties of copolymers and crosslinked rubbers were evaluated by the following methods.

(1) Bound Styrene Content

The content of bound styrene in a copolymer rubber was determined according to JIS K6383 (a refractive index method).

(2) Content of Amino Group-Containing Monomer Units

The content of amino group-containing monomer units in a copolymer rubber was determined as follows. A copolymer rubber was dissolved in tetrahydrofuran, and then precipitated by a mixed liquid of methanol/acetone (50/50% by volume) to precipitate the copolymer. This dissolution-precipitation procedure was carried out twice. The precipitate was vacuum-dried and measurement was conducted according to 500MHz $^1$H-NMR.

(3) Content of Hydroxyl Group-Containing Monomer Units

The content of hydroxyl group-containing monomer units in a copolymer rubber was determined by the method described in JP-A H3-174408 as follows. A copolymer rubber was treated with phenyl isocyanate, and thereafter, content of phenyl group of phenyl isocyanate was determined according to $^{13}$C-NMR spectrum.

(4) Viscosity

Mooney viscosity ($ML^{1+4}$, 100°C.) of a copolymer rubber and viscosity of a rubber composition were determined according to JIS K6300.

(5) Elongation Index

Elongation at break of rubber vulcanizate was measured according to JIS K6251. The elongation of rubber vulcanizate in each working example was expressed by an index number which was a relative value as the elongation of rubber vulcanizate in Comparative Example 1 was 100.

(6) Heat Build-up Index

Tanδ was measured at a twist of 1%, a frequency of 20 Hz and a temperature of 60° C. by using "RDA-II" supplied by Rheometrics Co. The heat build-up was expressed by an index number which was a relative value of tanδ as the tanδ in Comparative Example 1 was 100.

(7) Presence of 1,1-di(2,2-dimethylpropyl)-1-ethylthio group

The presence of 1,1-di(2,2-dimethylpropyl)-1-ethylthio group in a copolymer rubber was confirmed as follows. A copolymer rubber was dissolved in benzene and then precipitated with methanol. This dissolution-precipitation procedure was repeated three times, and then thoroughly purified to prepare a specimen. By measurement of the specimen using $^1$H-NMR (400 MHz), a peak in the vicinity of 1.05 ppm due to a proton of the terminal methyl group in the 1,1-di(2,2-dimethylpropyl)-1-ethylthio group was detected. By measurement using $^{13}$C-NMR (100 MHz), a peak in the vicinity of 54.6 ppm due to the carbon atom of —CH$_2$— group in said ethylthio group was detected.

In Example 4, a specimen was prepared by taking a minor amount of rubber from a polymerization liquid before an extender oil was added.

In Table 1, "found" and "not found" means that the presence of the ethylthio group was found and not found, respectively.

Example 1 and 2, and Comparative Example 1 and 2

A reactor equipped with a stirrer was charged with 200 parts by weight of water, 3 parts by weight of rosin soap, and monomers (their kinds and amounts are shown in Table 1) and a molecular weight modifier (its kind and amount are shown in Table 1). The reactor temperature was 8° C. 0.1 part of cumene hydroperoxide as a free-radical initiator, 0.2 part of sodium formaldehyde sulfoxylate and 0.01 part of ferric sulfate were added to initiate polymerization. When the conversion reached 60% by weight, an additional amount (shown in Table 1) of the molecular weight modifier was added. When the conversion reached 60% by weight, 0.1% by weight of diethylhydroxylamine was added to terminate the polymerizatioon. Unreacted monomers were recovered from the polymerization liquid, the polymer was coagulated by adding sulfuric acid and sodium chloride to obtain a crumb. The crumb was dried by a crumb dryer to obtain a conjugated diene rubber. Rubbers obtained in Examples 1 and 2 (present invention) are referred to as diene rubbers 1 and 2, respectively, and those obtained in Comparative Examples 3 and 4 (outside the present Invention) are referred to as diene rubbers 3 and 4, respectively. The properties of diene rubbers 1 and 2 are shown in Table 1, and the properties of diene rubbers 3 and 4 are shown in Table 2.

TABLE 1

|  | Example 1 | Example 2 |
|---|---|---|
| Diene Rubber | 1 | 2 |
| Monomers charged (wt. parts) |  |  |
| Butadiene | 51 | 51 |
| Styrene | 48.2 | 48.2 |
| N,N-dimethylaminopropylacrylamide | 0.8 | — |
| 2-Hydroxyethyl methacrylate | — | 0.8 |
| Molecular weight modifier 2,2',4,6,6'-pentamethylheptane-4-thiol |  |  |
| Initial amount charged (wt. parts) | 0.15 | 0.195 |
| Additional amount at 40 wt. % conversion (wt. parts) | 0.05 | 0.065 |
| Content of bound monomer units |  |  |
| Styrene units (wt. %) | 40.3 | 40.2 |
| Amino group-containing monomer units (wt. %) | 0.4 | — |
| Hydroxyl group-containing monomer units (wt. %) | — | 1 |
| Presence of 1,1-di(2,2-dimethyl-propyl)-1-ethylthio group | Found | Found |
| Mooney viscosity | 59 | 58 |

TABLE 2

|  | Comparative Example 1 | Comparative Example 2 |
|---|---|---|
| Diene Rubber | 3 | 4 |
| Monomers charged (wt. parts) |  |  |
| Butadiene | 51 | 51 |
| Styrene | 48.2 | 48.2 |
| N,N-dimethylaminopropylacrylamide | 0.8 | 0.8 |
| 2-Hydroxyethyl methacrylate | — | — |
| Molecular weight modifier n-Dodecyl mercaptan |  |  |
| Initial amount charged (wt. parts) | 0.195 | — |
| Additional amount at 40% conversion (wt. parts) | 0.065 | — |
| α-methylstyrene dimer |  |  |
| Initial amount charged (wt. parts) | — | 1.05 |
| Additional amount at 40% conversion (wt. parts) | — | 0.35 |
| Content of bound monomer Units (wt. %) |  |  |
| Styrene units | 40.3 | 40.3 |
| Amino group-containing monomer units | 0.4 | 0.4 |
| OH group-containing monomer units | — | — |
| Presence of 1,1-di(2,2-dimethyl-propyl)-1-ethylthio group | Not found | Not found |
| Mooney viscosity | 58 | 62 |

Example 3 and 4, and Comparative Examples 3 and 4

A rubber composition was prepared from each of diene rubbers 1 to 4 according the recipe shown in Table 3. That is, rubber (in an amount shown in Table 3), silica ("Z1165MP" supplied by Rhone-Poulenc; nitrogen absorption specific surface area: 175 m2/g; a half of the amount shown in Table 3), and a silane coupling agent ("Si69" supplied by Degussa; a half of the amount shown in Table 3) were mixed together at 170° C. for 2 hours. The other ingredients (other than sulfur and crosslinking accelerator) were added and the mixture was kneaded together at 170° C. for 2 minutes. Zinc oxide used was zinc white #3 (supplied by Honjou Chemical; average particle diameter: 0.4 μm). The antioxidant used was "Noolac 6C"™ (supplied by Ouchi Shinko). The obtained mixture was kneaded together with sulfur (in an amount shown in Table 3) and crosslinking accelerator ("Nooceler"™ supplied by Ouchi Shinko; in an amount shown in TAble 3) at 50° C. by using an open roll to prepare a rubber composition. The rubber composition was press-crosslinked at 160° C. for 30 minutes to prepare a specimen. The properties of each specimen were evaluated. The results are shown in Table 3.

TABLE 3

|  | Example | | Comparative Example | |
|---|---|---|---|---|
|  | 3 | 4 | 3 | 4 |
| Composition (wt. parts) |  |  |  |  |
| Diene rubber 1 | 100 | — | — | — |
| Diene rubber 2 | — | 100 | — | — |
| Diene rubber 3 | — | — | 100 | — |
| Diene rubber 4 | — | — | — | 100 |
| Silica | 55 | 55 | 55 | 55 |
| Extender oil | 10 | 10 | 10 | 10 |
| Silane coupling agent | 4.4 | 5.6 | 5.6 | 5.6 |
| Stearic acid | 2 | 2 | 2 | 2 |

TABLE 3-continued

|  | Example | | Comparative Example | |
| --- | --- | --- | --- | --- |
|  | 3 | 4 | 3 | 4 |
| Zinc oxide | 1.5 | 1.5 | 1.5 | 1.5 |
| Antioxidant | 2 | 2 | 2 | 2 |
| Sulfur | 1.5 | 1.5 | 1.5 | 1.5 |
| Crosslinking accelerator | 2.4 | 2.4 | 2.4 | 2.4 |
| Properties of composition | | | | |
| Viscosity of composition | 92 | 88 | 100 | 92 |
| Elongation index | 114 | 108 | 100 | 102 |
| Heat build-up index | 88 | 91 | 100 | 106 |

As seen from comparison of Example 3 with Comparative Examples 3 and 4, a rubber prepared by polymerization using 2,2',4,6,6'-pentamethylheptane-4-thiol as a molecular weight modifier exhibits reduced viscosity, large elongation and reduced heat build-up as compared with a rubber prepared by polymerization without the thiol compound.

INDUSTRIAL APPLICABILITY

The diene rubber of the invention is characterized in that, when silica is incorporated therewith, the resulting rubber composition exhibits greatly improved tensile strength and abrasion resistance while a good rolling resistance of tires, attained by the incorporation of silica, can be kept. The rubber composition also has a good processability. Thus, the rubber composition has a low viscosity and a vulcanizate thereof exhibits good elongation properties and low heat build-up. Therefore, the diene rubber of the invention has a wide use and can be advantageously used as, for example, tire parts such as tread, caroass, sidewall and bead; rubber articles such as hoses, window frames, belts, shoe soles, vibration insulators and automobile parts; and reinforcing rubbers for high-impact polystyrene, ABS resin and other resins. The rubber of the invention is especially useful for tread of tires of low fuel consumption, and further for tread, sidewall, under-tread, carcass and bead of four-seasons tires, high-performance tires and studless tires.

What is claimed is:

1. A diene rubber which is a copolymer comprising (1) 30 to 85% by weight of conjugated diene monomer units, (2) 15 to 50% by weight of aromatic vinyl monomer units and (3) 0.05 to 20% by weight of units of a vinyl monomer having at least one kind of polar group selected from the group consisting of N,N-disubstituted-aminoalkyl acrylates, N,N-disubstituted-aninoalkyl methacrylates, N,N-disubstituted-aminoalkyl acrylamides, N,N-disubstituted-aminoalkyl methacrylamides, hydroxyl-substituted-alkyl acrylates and hydroxyl-substituted-alkyl methacrylates; said diene rubber having in the molecule an alkylthio group having 12 to 16 carbon atoms, which include at least three tertiary carbon atoms, and having a sulfur atom which is directly bound to at least one of the tertiary carbon atoms.

2. The diene rubber according to claim 1 wherein the copolymer comprises (1) 40 to 81.8% by weight of conjugated diene monomer units, (2) 18 to 45% by weight of aromatic vinyl monomer units and (3) 0.2 to 15% by weight of units of a vinyl monomer having a polar group.

3. The diene rubber according to claim 1, wherein the alkylthio group is 1, 1-di (2,2 -dimethylpropyl)-1-ethylthio group or 1,1-di(2,2-dimethylpropyl)-1-(2,2,4,4-tetramethylpentyl)-1-ethylthio group.

4. The diene rubber according to claims 1 wherein the content of the alkylthio group in the molecule of the conjugated diene rubber is at least 0.03 mol per 100 mols of the total monomer units constituting the molecule.

5. The diene rubber according to claims 1 wherein the diene rubber has a Mooney viscosity ($ML_{1+4}$, 100° C.) of 20 to 200.

6. A process for producing a diene rubber which comprises copolymerizing (1) a conjugated diene monomer, (2) an aromatic vinyl monomer and (3) a vinyl monomer having at least one kind of polar group selected from the group consisting of N,N-disubstituted-aminoalkyl acrylates, N,N-disubstituted-aminoalkyl methacrylates, N,N-disubstituted-aminoalkyl aorylamides, N,N-disubstituted-aminoalkyl methacrylamides, hydroxyl-substituted-alkyl acrylates and hydroxyl-substituted-alkyl methacrylates, in the presence of (a) an alkylthiol compound having 12 to 16 carbon atoms, which include at least three tertiary carbon atoms, and having a sulfur atom which is directly bound to at least one of the tertiary carbon atoms, and (b) a free-radical initiator.

7. The process for producing a diene rubber according to claim 6, wherein the alkylthiol compound (a) is 2,2',4,6,6-pentamethylheptane-4-thiol or 2,2',4,6, 6',8,8'-heptamethylnonane-4-thiol.

8. The process for producing a diene rubber according to claim 6, wherein the amount of the alkylthiol compound (a) is in the range of 0.05 to 3 parts by weight based on 100 parts by weight of the monomers.

9. The process for producing a diene rubber according to claims 6, wherein the amount of the free-radical initiator (b) is in the range of 0.005 to 3 parts by weight based on 100 parts by weight of the monomers.

10. A diene rubber produced by the process as described in claims 6.

11. A rubber composition which comprises a rubber ingredient comprising the diene rubber as claimed in claims 1 and claim 10, and further comprises a reinforcing agent comprising silica.

12. The rubber composition according to claim 11, wherein the silica has a specific surface area of 50 to 400 $m^2/g$.

* * * * *